Patented Dec. 19, 1944

2,365,417

UNITED STATES PATENT OFFICE 2,365,417

PROCESS OF MANUFACTURING SODIUM CYANIDE

David Kusman, Brussels, Belgium; vested in the Alien Property Custodian

No Drawing. Application June 5, 1940, Serial No. 339,015. In Belgium June 16, 1939

4 Claims. (Cl. 23—79)

The present invention relates to the manufacture of sodium cyanide by direct neutralisation of caustic soda with hydrocyanic acid.

The neutralisation of caustic soda by means of hydrocyanic acid is usually carried out by leading a current of gaseous hydrocyanic acid into a more or less concentrated solution of caustic soda. A solution of sodium cyanide is obtained and, after evaporating same under vacuum, cyanide may be collected in powder form.

It is not possible however to obtain a pure product in this manner, as sodium cyanide is not stable when in solution. Towards the end of the neutralisation process a partial decomposition tends to take place and this tendency increases as the temperature rises. The decomposition is made apparent by darkening of the color of the product which becomes more and more brown as the duration of evaporation is longer. Now the amount of water to be evaporated at low temperature is considerable, as the amount of water in which the caustic soda is dissolved is increased by a further amount resulting from the neutralisation reaction:

$$NaOH + HCN = NaCN + H_2O$$

If browning of the solution is to be avoided a substantial amount of caustic soda must be allowed to remain in the solution, so that in the final product obtained by dry evaporation the NaCN content hardly exceeds 90%.

In order to dispense with evaporation and the consequent inconveniences, it has been proposed to carry out neutralisatiaon by reacting hydrocyanic acid with solid anhydrous caustic soda in powder or in flake form, towards 200° C. It was thought that at that temperature there would be no browning of the product, the water formed by the reaction being directly converted into vapor. This, however, is not always the case and moreover this method only makes it possible to convert up to 60% of the caustic soda treated. In order to obtain a richer product it is necessary again to crush the mass and again to saturate same with hydrocyanic acid, these operations often having to be repeated several times. This method accordingly is complicated and unreliable; it requires a large number of absorption receptacles and the use of elevated temperatures which is not without danger with a gas of the nature of hydrocyanic acid.

It has also been proposed to neutralise with hydrocyanic acid a concentrated (1:1) aqueous solution of caustic soda, then to precipitate by alcohol the resulting sodium cyanide, subject to filtration and dry in vacuo the crystals obtained. The filtrate is added to a further amount of caustic soda, then the alcohol present is separated by decantation in order to recuperate as much as possible thereof. Besides requiring the intervention of a foreign reagent, namely alcohol, of which a certain quantity is lost, this method does not entirely dispense with evaporation, since it still is necessary to eliminate the water that accumulates as a result of the reaction:

$$NaOH + HCN = NaCN + H_2O$$

The amount of water thus freed is 0.368 kg. per kg. of sodium cyanide which is not negligible.

The object of the present invention is to avoid the above inconveniences and to obtain a white, high-grade product without losing any of the materials used as reagents.

In accordance with this invention hydrocyanic acid is reacted with caustic soda in crystal form, in presence of as little water as possible. Under these conditions the caustic soda crystals (NaOH.H_2O) are converted into sodium cyanide crystals (NaCN.2H_2O) without freeing any water, according to the reaction:

$$NaOH.H_2O + HCN = NaCN.2H_2O$$

Thus is avoided the necessity of evaporating which, in former processes, was due to the continuous freeing of water in the course of the reaction.

In carrying out the new process, I dissolve at an elevated temperature anhydrous caustic soda in an amount of water proportioned to obtain a 60 to 69% NaOH concentration. The 69% proportion corresponds theoretically to the formation of crystals without excess water, but in actual practice a slight water excess is not only tolerable but is desirable in order to keep in solution, in presence of the cyanide, a little caustic soda that counteracts the tendency to browning.

The 60–69% caustic soda solution is cooled and crystallises at 18° C., forming hydrate NaOH.H_2O. This crystalline mass, while subjected to cooling and continuous stirring, eagerly absorbs hydrocyanic acid, and is rapidly and completely neutralised.

When the crystals have been converted into sodium cyanide, the mass is drained to separate the small excess of water and caustic soda.

The cyanide crystals are white and they can be readily dehydrated by heating in vacuo to a temperature of 40 to 70° C. A white powder is obtained, which contains 98% or more of NaCN and is suitable for use either as it is, or after being compressed into tablets.

*Example*

106 g. of caustic soda are dissolved in 71 g. water at elevated temperature, towards 90° C., then the mass is allowed to crystallise while cooling and stirring. Neutralisation is effected by 68 g. of hydrocyanic acid gas, while cooling and stirring are continued in order to disperse the heat evolved by the neutralising reaction. After draining, there are collected 145 g. of crystals ($NaCN.2H_2O$) which, after being dehydrated in vacuo, yield 82 g. NaCN at 98%.

The mother liquor drained is added to the caustic soda used for the next operation.

The process may also be carried out with hydrocyanic acid in liquor form, provided the temperature be kept under its vaporising point (26° C.).

I claim:

1. In a process of preparing sodium cyanide, reacting anhydrous hydrocyanic acid with caustic soda in solid crystal form in presence of a small amount of caustic soda in aqueous solution thereby producing sodium cyanide in crystal form, and draining the excess caustic soda solution from the sodium cyanide crystals, the quantity of anhydrous hydrocyanic acid used being less than that required to react with all the caustic soda present.

2. In a process of preparing sodium cyanide, preparing at elevated temperature an aqueous solution of caustic soda containing from 60 to 69% NaOH, cooling said solution to 18° C. and causing substantially all of said caustic soda to crystallise from solution while leaving a small residual quantity thereof in solution, reacting anhydrous hydrocyanic acid with the crystallised mass thereby producing sodium cyanide crystals, and draining the solution from said sodium cyanide crystals.

3. In a process of preparing sodium cyanide, preparing at about 90° C. an aqueous solution of caustic soda containing from 60 to 69% NaOH, cooling said solution to 18° C. while stirring and causing said caustic soda to crystallise, reacting anhydrous hydrocyanic acid with the crystallised mass while cooling and stirring thereby producing sodium cyanide crystals, and draining the solution from said sodium cyanide crystals.

4. In a process of preparing sodium cyanide, preparing at about 90° C. an aqueous solution of caustic soda containing at least 60% but less than 69% NaOH, cooling said solution to 18° C. while stirring thus causing nearly all the caustic soda in said solution to crystallise, there remaining in solution a small excess of caustic soda, reacting gaseous anhydrous hydrocyanic acid with said caustic soda while cooling and stirring, the amount of hydrocyanic acid being limited so as to convert into sodium cyanide crystals a quantity of caustic soda equal to the quantity previously crystallised, and draining the excess solution of caustic soda from said sodium cyanide.

DAVID KUSMAN.